US011199056B2

(12) United States Patent
Yao (10) Patent No.: US 11,199,056 B2
(45) Date of Patent: Dec. 14, 2021

(54) THREADED COUPLING FOR PERCUSSION DRILL BIT

(71) Applicant: James Jing Yao, Mississauga (CA)

(72) Inventor: James Jing Yao, Mississauga (CA)

( * ) Notice: Subject to any disclaimer, the term of this patent is extended or adjusted under 35 U.S.C. 154(b) by 104 days.

(21) Appl. No.: 16/268,677

(22) Filed: Feb. 6, 2019

(65) Prior Publication Data

US 2020/0248510 A1 Aug. 6, 2020

(51) Int. Cl.
*E21B 17/042* (2006.01)
*E21B 10/42* (2006.01)
*E21B 10/38* (2006.01)

(52) U.S. Cl.
CPC .......... *E21B 17/0426* (2013.01); *E21B 10/38* (2013.01); *E21B 10/42* (2013.01); *B23G 2210/44* (2013.01)

(58) Field of Classification Search
CPC ............... B23G 2210/44; E21B 17/042; E21B 10/36–40
USPC ................................. 285/333, 334, 355, 390
See application file for complete search history.

(56) References Cited

U.S. PATENT DOCUMENTS

| 4,332,502 A | | 6/1982 | Wormald et al. | |
|---|---|---|---|---|
| 4,687,368 A | * | 8/1987 | Eklof | E21B 17/0426 285/334 |
| 5,163,523 A | * | 11/1992 | Yousef | E21B 17/0426 175/320 |
| 6,196,598 B1 | * | 3/2001 | Yao | E21B 17/0426 285/333 |
| 6,202,768 B1 | * | 3/2001 | Lindgren | E21B 10/40 175/385 |
| 6,293,360 B1 | * | 9/2001 | Liljebrand | E21B 17/0426 175/320 |
| 6,767,156 B1 | * | 7/2004 | Larsson | E21B 17/0426 403/343 |
| 7,185,721 B2 | * | 3/2007 | Carlstrom | E21B 17/0426 166/242.6 |
| 10,584,545 B2 | * | 3/2020 | Jansson | E21B 17/0426 |
| 2009/0266615 A1 | * | 10/2009 | Yao | E21B 1/00 175/320 |

(Continued)

FOREIGN PATENT DOCUMENTS

| GN | 208152957 U | 11/2018 |
|---|---|---|
| WO | 2006/019346 A1 | 2/2006 |

OTHER PUBLICATIONS

International Search Report, PCT/IB2020/000078, dated Jun. 17, 2020.

(Continued)

*Primary Examiner* — Blake E Michener
*Assistant Examiner* — Theodore N Yao
(74) *Attorney, Agent, or Firm* — Cittone Demers & Arneri LLP; Henry J. Cittone; James Demers (57) ABSTRACT

An internally threaded bit for percussion drilling is provided, which has thread roots wider than the thread crests. A single drill bit, configured according to the present invention, can be connected to a variety of rods, having differing crest widths in their male threads. The invention enables the service life of the rods to be optimized to suit the drilling conditions at hand, without the need to manufacture and keep in inventory a correspondingly large variety of drill bits. The bit of the invention exhibits a reduced rate of ringing off, and can accept drill rods having a range of crest widths.

21 Claims, 5 Drawing Sheets

(56) References Cited

U.S. PATENT DOCUMENTS

2015/0367402 A1* 12/2015 Singh ...................... B21H 3/04
                                                         72/95

OTHER PUBLICATIONS

Written Opinion of The International Searching Authority, PCT/IB2020/000078, dated May 12, 2020.

* cited by examiner (PRIOR ART)

(PRIOR ART)

Fig. 5a                Fig. 5b

THREADED COUPLING FOR PERCUSSION DRILL BIT

RELATED APPLICATIONS

There are no related or priority applications.

FIELD OF THE INVENTION

The invention relates to the field of percussion drilling, and in particular to single-pass tunnel drilling. More specifically, the invention relates to threaded connections for affixing drill bits to the end of drill rods.

BACKGROUND OF THE INVENTION

Percussive single-pass drilling is widely seen in highway and railway tunneling, as well as in underground development drilling, where a single rod is used to transmit the impact energy received by the shank adapter at its rear end to the drill bit at its front end. This type of drilling is sometimes referred to as tunneling, drifting, or jumbo drilling.

The dominant hole-size for tunneling is 45 mm. There is very limited space for the bit connection, and the maximum thread diameter at the bit end is typically limited to around 33 mm. Since the rear end of the rod does not enter the hole being drilled, a larger diameter thread is often used at the rear end, and the thread joint between the bit and the rod is thus the weakest link in the drill string. Thread design for the bit end has been dominated for decades by a rope thread of 32 mm diameter (the "R32" thread), earning it the only ISO standard for percussion threads (ISO 10208).

In addition to the obvious wear to the cutting surfaces, a drill bit suffers from internal wear on the thread surfaces that connect it to the drill rod, and the rod threads are subject to comparable wear as well. Generally, the bit has a female-threaded cavity into which a rod having complementary male threads is fitted, and torque and impact forces are delivered to the bit, at least in part, through the contacting surfaces of the male and female threads. The resulting wear on these contacting surfaces is significant. Practitioners in the industry have put considerable time and effort into the creation of harder and tougher alloys, surface treatments, and specialized lubricants for this particularly high-stress, metal-to-metal interface. There has also been a great deal of effort put into engineering thread geometries that minimize, spread out, and re-direct the stresses created by the percussion drilling process, while still providing efficient transfer of rotary and axial forces to the cutting elements.

Examples of thread designs for drilling components may be found in U.S. Pat. Nos. 3,645,570, 4,687,368, 6,196,598, 4,332,502 and 4,861,209, and US Patent Application Publications 2010/0001522 and 2010/0059285. However, these designs focus on rod-to-rod connections in multi-pass drilling applications. Modern multi-pass rods have a male thread on one end and a female thread on the other, so that the rods can be strung together. Because worn out thread on either end results in the removal of the rod from service, the wear lives of the male and female thread need to be comparable, and the threads have been designed accordingly. As a result, rods in a drill string are all identical and little consideration has ever been given to the bit end thread design.

In connection with single-pass tunnel drilling, U.S. Pat. No. 8,066,307 teaches a conical thread and U.S. Pat. No. 7,185,721 teaches a shortened thread. Both designs increase the fatigue strength of the rod at the expense of the wear volume, delivering better rod lives by reducing fatigue breakages in some specific applications but unable to outperform the conventional R32 system in general. There is still a need for a better system for tunnel drilling which optimizes the service life of both the rod and the bit, and is more user friendly.

BRIEF DESCRIPTION OF THE INVENTION

A threaded coupling for connecting a drill bit to a rod in single-pass percussion drilling is provided, in which the root bottom in the bit thread is wider than the crest of the thread. A single drill bit, configured according to the present invention, can be connected to a variety of rods, having differing crest widths in their male threads. The invention enables the rods to be tailor-designed, and their service life optimized, to suit the drilling conditions at hand, without the need to manufacture and keep in inventory a correspondingly large variety of drill bits.

The invention provides a method of accommodating a plurality of drill rod thread profiles with a single drill bit, through the sequential use of a single drill bit with various drill rods having different thread crest widths.

The invention thus provides a method of reducing parts inventory at a drilling site, by operating the site with an inventory that contains a variety of drill rods having different thread crest widths, but which contains drill bits of a single thread design according to the invention.

DETAILED DESCRIPTION OF THE INVENTION

The service life of a drill bit is normally determined by the wear of the carbide inserts, and can be very short in extremely abrasive grounds. As a result, the average life of a drill rod is much longer than the bit life, often ten times longer or more. This means that the bit threads are often in good condition when the bit itself has to be retired due to carbide wear or breakage. In other words, much of the thread wear volume in the prior art bits is never utilized. The present invention makes use of this wasted wear volume through a modified thread design, in which the unused wear volume is effectively transferred to the rod material. The working life of the bit threads can thereby be matched to the life of the bit itself, and the rods given a correspondingly longer working life.

Manufacturers of drilling tools are confronted with the problem that their many different customers are operating under a wide range of different drilling conditions. For example, at some drilling sites the exposed rock surfaces at stope faces are badly weakened by previous blasts, and it is not easy to find a surface solid enough to effectively rattle loose a stuck bit. Excessive rattling causes damage to the tools, and a stuck bit puts the driller in danger when working outside the cabin, struggling to change the bit. A greater helix angle in the connecting thread is known to make the joint looser, thereby making it easier to change the bit, but this comes at the expense of an increased wear rate, a trade-off that may be worthwhile at one drilling site but not at another. For practical reasons, manufacturers have adopted a one-size-fits-all approach to the design of the drill bit to drill rod coupling, a compromise that often prevents the end user from making an optimal choice of bit and rod designs. The present invention provides the end-user with the ability to select the tools—in particular the drill rods— most suitable to the specific drilling conditions at hand.

Figure 1:
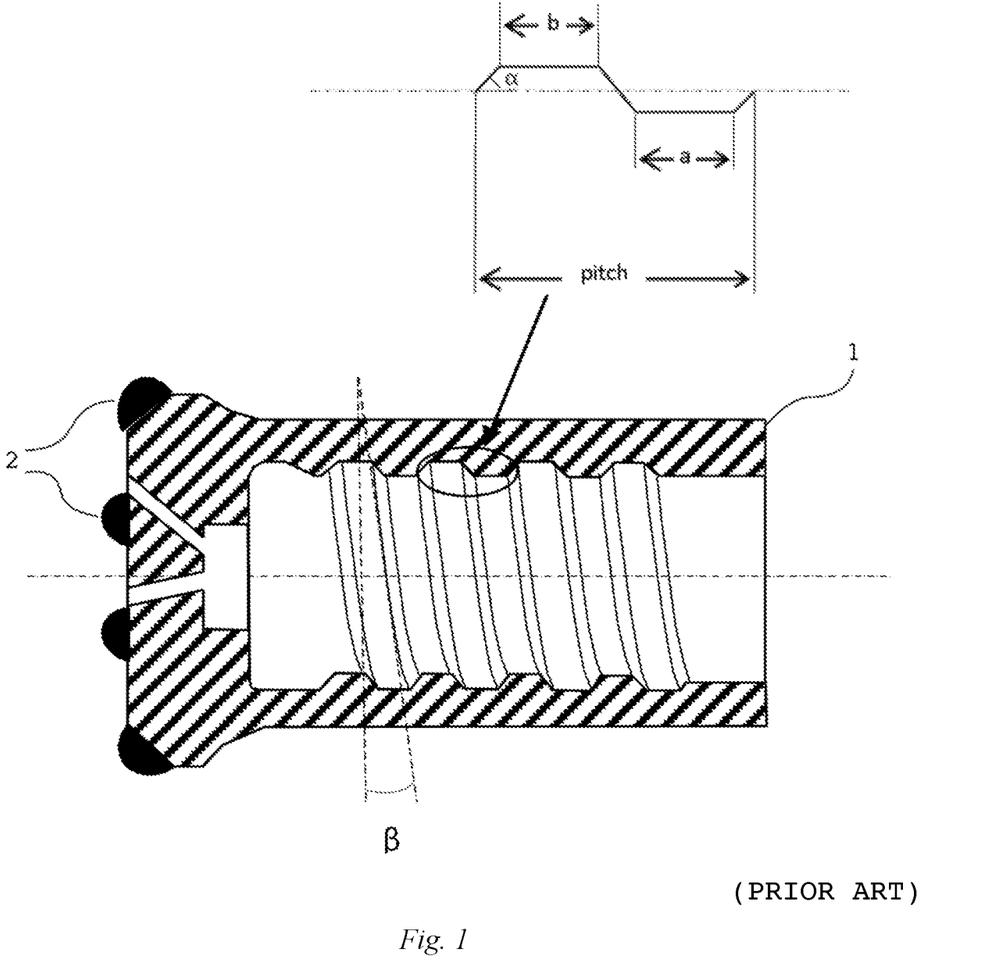
FIG. 1 is a cutaway view of a typical prior art drill bit.
Figure 4A:
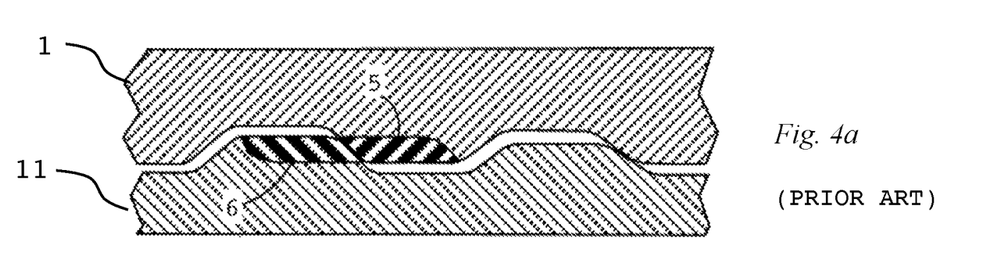
FIG. 4a shows a prior art drill bit thread mated to a prior art drilling rod.

The present invention is directed to improving the threaded coupling between a drill bit and a single-pass rod in percussive tunnel drilling. FIG. 1 shows a typical prior art drill bit 1 having carbide cutting inserts 2. The bit features an interior female thread for accepting the male threads of a drill rod, with the rod and bit threads having common helix angle $\beta$. The expanded area of the drawing shows the length of a single thread pitch, where the thread comprises a crown or crest having width a, and a root or groove of width b, connected by flanks at a flank angle $\alpha$. The most effective flank angle has been found, in practice, to be in the range of 30 to 40 degrees, with the industry having settled on 35 degrees as a standard. To the knowledge of the inventor, all bits in use today in the tunneling and mining industries have a~b, which is true of the male threads on the drill rods as well, as shown for example in U.S. Pat. Nos. 8,066,307 and 7,185,721. This results in the total wear volume being evenly distributed between the bit thread and the mating rod thread, as shown in FIG. 4a, which is inefficient because the wear volume 5 of the bit is not consumed at the same rate as the wear volume 6 of the rod.

Figure 2:
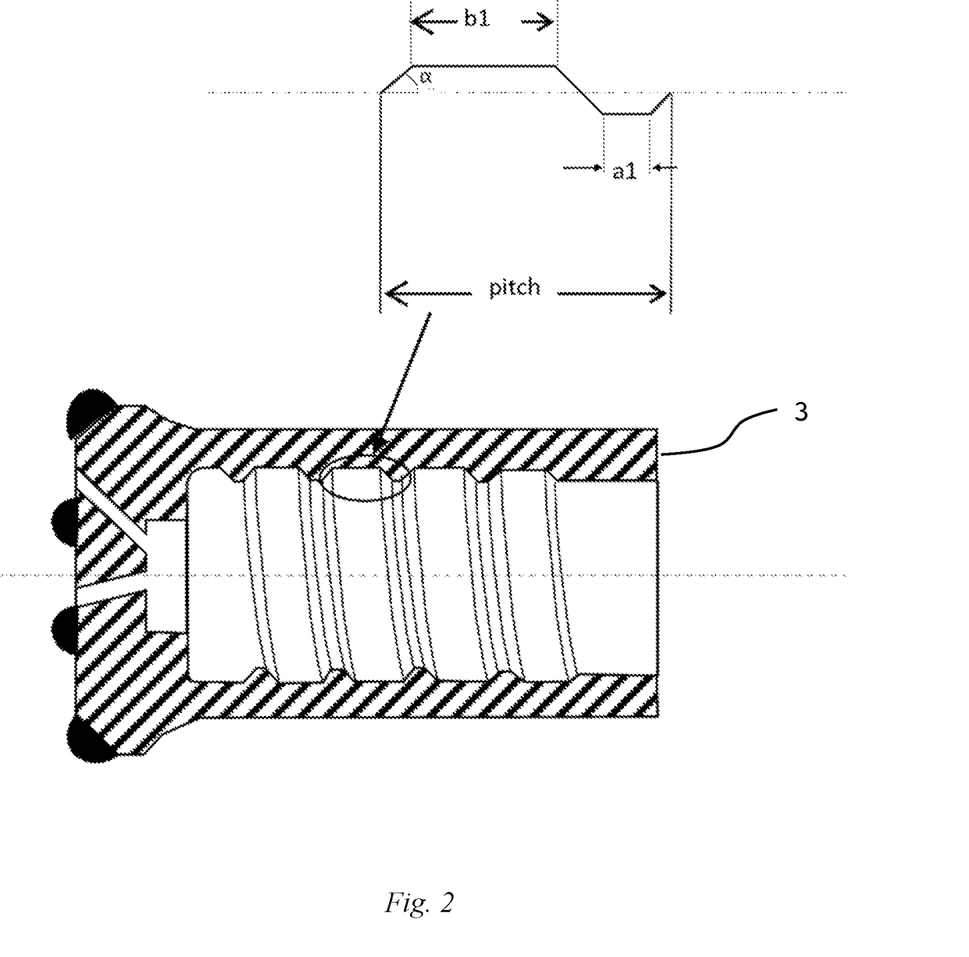
FIG. 2 is a cutaway view of a drill bit of the invention.
Figure 3A:
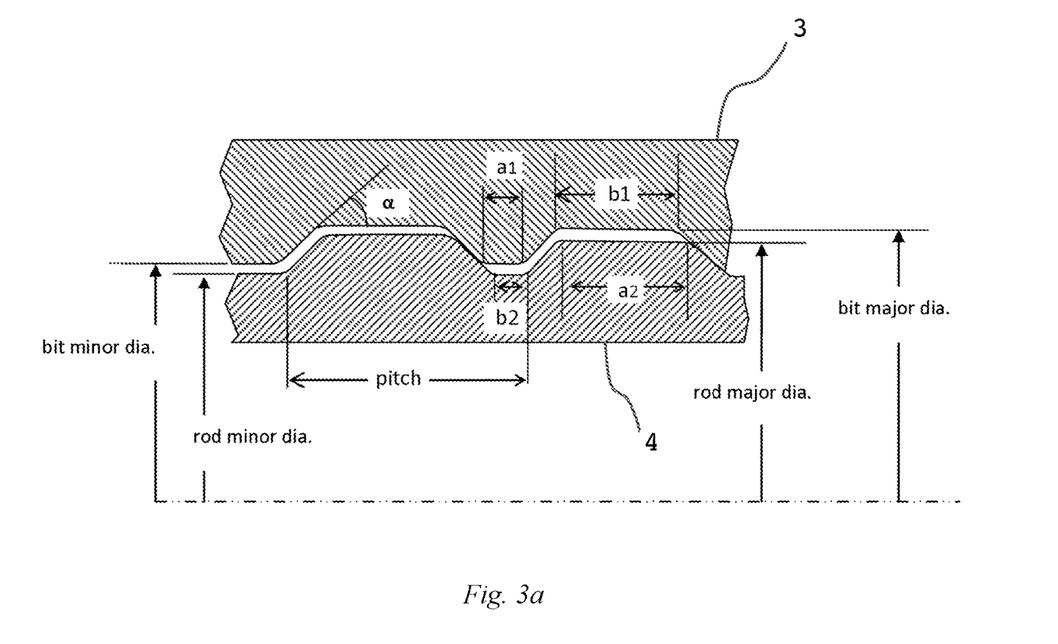
FIG. 3a shows a section of a drill bit of the invention, mated to a rod having a male thread with a crest wider than the root.

Since most of the wear volume in the bit is wasted in conventional couplings, as explained above, allowing the root to have a greater width than the crest (i.e., b1>a1, as shown in FIG. 2) will not have a negative effect on the life of a bit 3 of the invention. However, the expansion of the root (and thus the groove) on the bit 3 makes it possible to increase the crest width a2 in the rod thread, as shown in FIG. 3a, dedicating more material to the wear volume of the rod thread than is possible in the prior art design. As a result, the rod can have a significantly longer service life than is achievable with the products now on the market.

The ratio (b1/a1) according to the present invention is between 1.5 and 5, and preferably ranges from 2 to 4. The flank angle $\alpha$ is in the range of 30 to 40 degrees, preferably 34-36 degrees, and most preferably about 35 degrees. The helix angle $\beta$ is related to the pitch and diameter of the thread by the formula helix angle $\beta$=arctan[pitch/$\pi$(pitch diameter)]

where the pitch diameter is the mean of the major and minor diameters. As noted above, a greater helix angle makes it easier to loosen the bit by rattling. Preferable helix angles according to the present invention, suitable for single-pass drilling, range from 8 to 10 degrees, preferably from 8.5 to 9.5 degrees, compared to 6 to 8 degrees in most conventional threads. (The industry-standard R32 thread has a helix angle of 7.6°). Specific embodiments may have helix angles ranging from 9 to 9.5 degrees. These values are well outside of the combinations of pitch and flank angles disclosed in prior art publications such as U.S. Pat. Nos. 4,332,502 and 4,861,209.

Figure 3B:
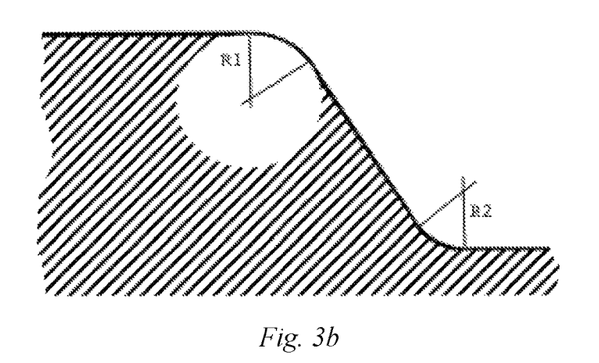
FIG. 3b is a detail of the thread profile of the invention.

The pitch of the thread is preferably 13 to 18 mm, and the thread depth preferably ranges from 1.2 to 1.8 mm. In order to avoid jamming, clearance is provided between the major diameters of the rod and the bit threads (FIG. 3a), as well as between the two minor diameters. The radius R1, which connects the thread crest and its adjacent flanks, is larger than the radius R2 connecting the root bottom and its adjacent flanks, in both the bit threads and the rod threads, as shown in FIG. 3b. This feature serves to minimize contact and interference when the threads are engaged. R1 may range from about 1.0 to about 5.0 mm, and is preferably about 2.5 to 3.5 mm, while R2 may range from about 0.5 to about 4.5 mm, and is preferably about 2.0 to 3.0 mm. A straight section should preferably exist on the flank, the length of which is 20% to 75% of the flank length, preferably 33% to 50%. The term "substantially trapezoidal profile" refers to trapezoidal threads modified by incorporation of the above curvatures. This difference between R1 and R2 ensures that there is no contact between the curved portions of the rod and bit threads. This minimizes the risk of wear or damage near the roots of the threads, where it is more likely to lead to stress cracks and fractures.

As further protection against rod failure, the rod thread may be given a greater height than the bit thread, so that the play between the root of the rod thread and the crest of the bit thread is greater than between the crest of the rod thread and the root of the bit thread.

Figure 4B:
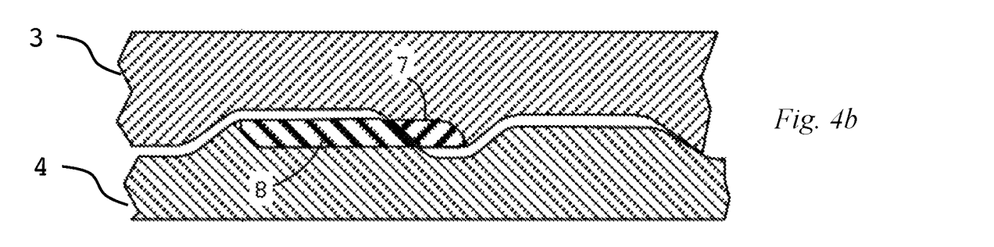
FIG. 4b shows a drill bit thread according to the invention, mated to a rod having a male thread that fills the groove of the bit.
Figure 4C:
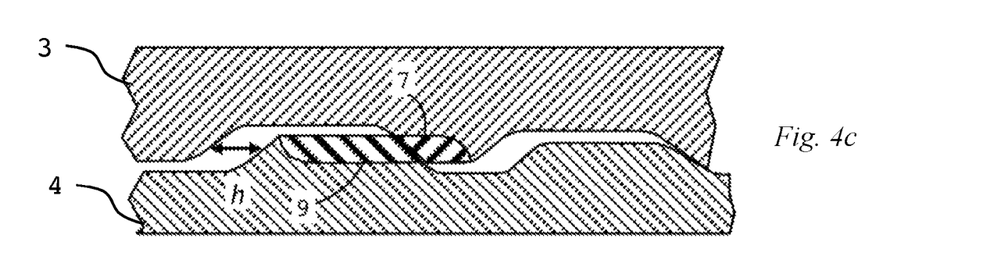
FIG. 4c shows a drill bit thread according to the invention, mated to a rod having a male thread that partially occupies the groove of the bit.
Figure 4D:
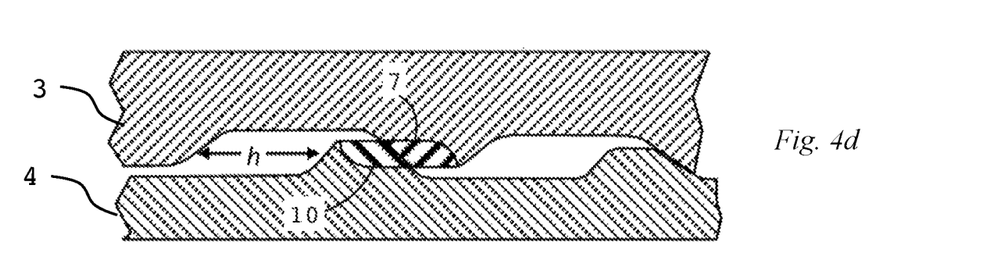
FIG. 4d shows a drill bit thread according to the invention, mated to rod having a matching crest width.

The ratio a2/b1 is the thread fullness, the degree to which the rod thread fills the groove of the bit thread, and this ratio is preferably in the range of 0.2 to 1.0. Depending on the specific drilling conditions, the end user can select rods with partial or full threads to obtain any degree of fullness in this range. If fatigue is not a concern, a high value of a2/b1, approaching 1.0, can be chosen, as shown in FIG. 4b, where the wear volume 8 of the rod is maximized, with the wear volume 7 of the bit only being sufficient to outlast the carbide inserts. In situations where fatigue failure is an issue, a smaller ratio can be chosen, as in FIG. 4c, so as to change the failure mode from fatigue cracking to the preferred mode of thread wear, by virtue of the reduced wear volume 9. In extreme cases, the wear volumes 7 and 10 can be matched, as in FIG. 4d, so that the rod and bit threads wear at approximately the same rate. FIGS. 4b-4d also roughly represent the progression of wear of a rod's threads, with the gap h increasing over time. It is a feature of the thread design of the invention that the bit and rod connection remains tight, even as the rod threads wear down and the gap h grows larger.

U.S. Pat. No. 6,196,598 and US Patent Application Publications 2010/0001522 and 2010/0059285 discuss the use of a wider crest than root in the rod thread, so that a lower-cost sleeve coupling can be treated as a sacrificial part, in a manner similar to what is shown in FIG. 4b. However, due to the narrowness of the "notches" or thread grooves, the stress concentration at the thread root in these full-thread rods is greater than in the less-full rods. In many drilling sites such rods will fracture due to fatigue long before reaching the stage shown in FIG. 4c, let alone that shown in FIG. 4d. Therefore, the present invention gives the end user an option to start with a less full thread as shown in FIG. 4c so that fatigue fracture can be completely avoided. This provides an advantage over the use of conventional systems, when end users experience a sudden increase in rod breakage due to a change in drilling conditions. The usual response in the field is to blame this on a "bad batch" of rods. If conditions do not return to normal, the user will switch suppliers, which causes problems with logistics without actually solving the problem. A user of the present invention, in contrast, can simply switch to a less-full grade of rods, which are likely to be replaced due to wear before fatigue-related fracture sets in.

Regardless of the fullness of the selected rod thread, all that are within the range will be compatible with the bits used for the full threads, as depicted in FIGS. 4b-4d. Hence, an end user can operate with a single bit thread design, without the issue of mismatch between the bit and the selection of rods kept on hand.

A bit according to the present invention is also less likely to "ring off". In ringing off, the bit fractures into two parts: most of the skirt separates from the head, which retains only a small portion of the skirt. This mode of failure is due to fatigue in the thread root closest to the bottom of the socket. The use of threads according to the invention does not negatively affect the wear life of the bit, as noted above, but the increased groove width reduces stress concentration at the thread roots, resulting in an increased service life and a reduced incidence of ringing off due to fatigue.

The major and minor diameters of the thread on the bit may have a mean value ranging from 27 to 35 mm, preferably in the range of 30 to 32 mm. The crest width $a1$ in the drill bits of the invention ranges from 6.5% to 14.5% of the mean diameter, while the root width $b1$ ranges from 23% to 30% of the mean diameter. Thus, in the various embodiments, as the mean diameter is made larger, the pitch, and the values for $a1$, $a2$, $b1$ and $b2$, will be proportionally larger. Representative ranges of values for various mean diameters are shown in Table 1:

TABLE 1

| Mean diameter (mm) | Crest width a1 (mm) | Root width b1 (mm) |
|---|---|---|
| 27 | 1.76-3.92 | 6.21-8.10 |
| 29 | 1.89-4.21 | 6.67-8.70 |
| 31 | 2.02-4.50 | 7.13-9.30 |
| 33 | 2.15-4.79 | 7.59-9.90 |
| 35 | 2.28-5.08 | 8.05-10.5 |

By way of example, three embodiments of the present invention are described below in detail, with wear life increases for the rods calculated from their increased wear volume. From FIG. 4a it can be seen that the wear volume is roughly proportional to the crest length. Most of region w1 is wasted wear volume that is never utilized in the prior art bits. The standard R32 (ISO 10208) thread is a rope thread, where the crown is continuously curved, therefore the wear volume is slightly less than in the illustrated trapezoidal thread, where the crests are flat. A trapezoidal thread with the 12.7 mm pitch of the R32 thread will have a crest length of 4.2 mm, which number is used in the following examples to calculate the wear life increases. These increases would be even larger relative to the wear of a rod having an R32 rope thread, which starts out with a smaller wear volume.

EXAMPLE 1

Major diameter=32 mm
Minor diameter=29 mm
Thread depth=1.5 mm
Pitch=15 mm
Helix angle=8.9°
Flank angle $\alpha$=35°
$a2$=$b1$=7.7 mm
$b2$=$a1$=3.0 mm
Thread fullness $a2/b1$=1.0
The rod wear life increase, from that of R32, is at least 83%.

In this embodiment, the crest width $a1$ is reduced from 4.2 mm to 3.0 mm in the bit, and the crest $a2$ of the rod thread fully occupies the valley in the bit thread (FIGS. 3a and 4b). If an even larger increase in the wear life is desired, $a1$ could be further reduced to 2.0 mm to accommodate an even larger $a2$. To have sufficient thread strength, however, $a1$ is preferably not less than 2.0 mm.

EXAMPLE 2

Major diameter=32 mm
Minor diameter=29 mm
Thread depth=1.5 mm
Pitch=14 mm
Helix angle=8.3°
Flank angle $\alpha$=35°
$a2$=5.5 mm
$b1$=7.2 mm
$a1$=2.5 mm
$b2$=4.2 mm
Thread fullness $a2/b1$=0.76
The rod wear life increase, from that of R32, is at least 31%.

In this embodiment, illustrated in FIG. 4c, the crest width $a1$ is reduced from 4.2 mm to 2.5 mm in the bit, and the crest of the rod thread occupies the valley in the bit thread with a fullness of 0.76, leaving a gap h of 1.7 mm. A partially-full thread on the rod, as in this embodiment, is easier to break loose from the bit, and also results in a reduced stress concentration at the root corners of the rod threads, where fatigue cracks are known to arise.

EXAMPLE 3

Major diameter=33 mm
Minor diameter=30 mm
Thread depth=1.5 mm
Pitch=16 mm
Helix angle=9.2°
Flank angle=35°
$a2$=7.0 mm
$b1$=9.2 mm
$b2$=4.7 mm
$a1$=2.5 mm
Thread fullness $a2/b1$=0.76
The rod wear life increase, from that of R32, is at least 67%.

In this embodiment, also represented by FIG. 4c, the diameter and pitch of the threads has been increased. The crest width $a1$ is again 2.5 mm in the bit, and the crest of the rod thread does not fully occupy the groove in the bit thread, leaving a gap h of 2.2 mm. This design, like example 2, serves the situations where the fatigue failure of the rod is a concern. This embodiment demonstrates that even without a full thread, a significant increase in the rod wear life can be achieved.

The invention, broadly, provides drill bits having thread roots wider than the thread crests. The invention further provides a method of accommodating multiple drill rod thread profiles with a single bit. Accordingly, the invention further provides a method of operating a drilling rig with a variety of drill rod profiles, without the expense of a corresponding variety of drill bits, and a method of reducing the inventory of drill bits at a drilling site.

The principles of this invention have been illustrated with trapezoidal threads in the drawings and examples, but the invention is contemplated to be operable with embodiments having continuously curved threads, and threads of intermediate form.

Figure 5A:
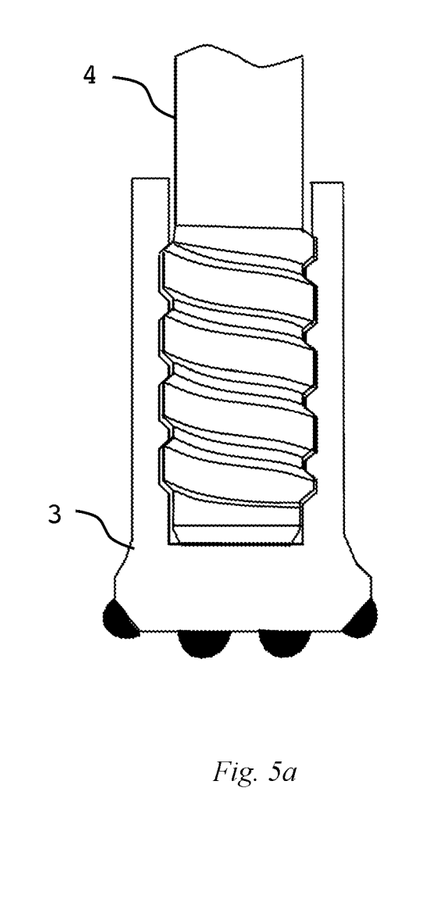
FIG. 5a shows a bottom-drive embodiment of the invention.
Figure 5B:
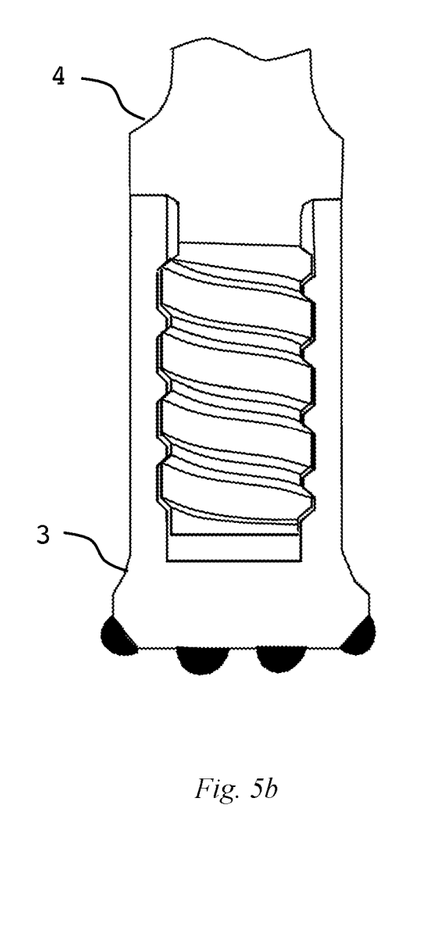
FIG. 5b shows a shoulder-drive embodiment of the invention.

The drill bits of the present invention can be employed either in so-called bottom-drive mode where the rod end impacts the bottom of the bit socket, or shoulder-drive mode where there is a gap between the rod end and the socket bottom, as depicted in FIGS. 5a and 5b, respectively. The latter mode provides a more rigid assembly, a quality much desired by drillers, especially during collaring (the initial formation of the drill hole.)

The above detailed description, and the attached drawings, present specific and non-limiting embodiments and examples of the invention. Modifications, equivalents, and variations that are obvious to those of skill in the art are contemplated by the inventor to be part of this invention, and the following claims are intended to be construed accordingly.

I claim:

1. A drill bit for percussion drilling, having an internal female thread, wherein the thread is characterized by having:
   (a) a substantially trapezoidal profile,
   (b) a mean thread diameter in the range 28 to 35 mm,
   (c) a crest width a1 in the range 6.5% to 14.5% of the mean thread diameter,
   (d) a root width b1 in the range 23% to 30% of the mean thread diameter,
   (e) a ratio of root width to crest width in the range $1.5 < (b1/a1) < 4$,
   (f) a flank angle $\alpha$ in the range 30 to 40 degrees,
   (g) a first curved profile, with a first radius from 1 mm to 5 mm, connecting the crest to the flanks,
   (h) a second curved profile, with a second radius from 0.5 mm to 4.5 mm, connecting the root to the flanks, and
   (i) the root having a flat portion of at least 4.0 mm length.

2. The drill bit according to claim 1, further characterized by having a pitch in the range 13 to 18 mm, and a thread depth in the range 1.2 to 1.8 mm.

3. The drill bit according to claim 1, further characterized by having a helix angle in the range 8.5 to 10 degrees.

4. The drill bit according to claim 2, further characterized by having a helix angle in the range 8.5 to 10 degrees.

5. The drill bit according to claim 3, wherein the helix angle is in the range 8.5 to 9.5 degrees.

6. The drill bit according to claim 4, wherein the helix angle is in the range 8.5 to 9.5 degrees.

7. The drill bit according to claim 3, wherein the helix angle is 9 degrees.

8. The drill bit according to claim 4, wherein the helix angle 9 degrees.

9. The drill bit according to claim 1, wherein the flank angle is in the range 34-36 degrees.

10. The drill bit according to claim 2, wherein the flank angle is in the range 34-36 degrees.

11. The drill bit according to claim 3, wherein the flank angle is in the range 34-36 degrees.

12. The drill bit according to claim 4, wherein the flank angle is in the range 34-36 degrees.

13. The drill bit according to claim 5, wherein the flank angle is in the range 34-36 degrees.

14. The drill bit according to claim 6, wherein the flank angle is in the range 34-36 degrees.

15. The drill bit according to claim 7, wherein the flank angle is in the range 34-36 degrees.

16. The drill bit according to claim 8, wherein the flank angle is in the range 34-36 degrees.

17. The drill bit according to claim 1, wherein the mean thread diameter is in the range 30 to 32 mm.

18. The drill bit according to claim 2, wherein the mean thread diameter is in the range 30 to 32 mm.

19. A method of percussion drilling comprising the sequential use of a drill bit according to claim 1 with a plurality of drill rods having different thread crest widths.

20. A method of reducing parts inventory at a percussion drilling site, comprising operating said site with said inventory containing a plurality of drill rods having different thread crest widths, wherein said inventory further contains at least one drill bit according to claim 1.

21. The drill bit according to claim 1, in combination with a drill rod having a male thread,
   wherein the male thread is characterized by having:
   (a) a third curved profile, connecting the crest of the male thread to the flanks of the male thread; and
   (b) a fourth curved profile, connecting the root of the male thread to the flanks of the male thread;
   wherein, when the rod is threaded into the bit, there is no contact between the curved portions of the rod thread and the curved portions of the bit thread.

* * * * *